Jan. 19, 1943.  A. C. ZIMMERMAN  2,309,032
UNITARY FLUID CONTROL VALVE AND METHOD OF OPERATION
Filed Oct. 24, 1938   9 Sheets-Sheet 3

INVENTOR
ARTHUR C. ZIMMERMAN
BY
Toulmin & Toulmin
ATTORNEYS

Jan. 19, 1943.  A. C. ZIMMERMAN  2,309,032
UNITARY FLUID CONTROL VALVE AND METHOD OF OPERATION
Filed Oct. 24, 1938  9 Sheets-Sheet 6

INVENTOR
ARTHUR C. ZIMMERMAN.
BY
ATTORNEYS

FIG. 12. BACKWASH POSITION.

FIG. 13. BRIDE DRAW POSITION.

Fig. 14. SLOW BRINE RINSE AND REFILL POSITION.

Fig. 15. FAST RINSE POSITION.

FIG. 16.   SOFTENING POSITION

BRINE VALVE CLOSED.

DOWN THROUGH MINERAL TANK.

RUBBER PAD CLOSING DRAIN PORT.

INVENTOR
ARTHUR C. ZIMMERMAN.
BY Toulmin & Toulmin
ATTORNEYS.

Patented Jan. 19, 1943

2,309,032

UNITED STATES PATENT OFFICE 2,309,032

UNITARY FLUID CONTROL VALVE AND METHOD OF OPERATION

Arthur C. Zimmerman, Dayton, Ohio, assignor to The Duro Company, Dayton, Ohio, a corporation of Ohio Application October 24, 1938, Serial No. 236,796

6 Claims. (Cl. 137—69)

This invention relates to a novel unitary control valve for use in fluid treating and distributing systems. The unitary control valve, for the purpose of illustration, is shown as embodied in a water softening system. This invention, however, is not limited to water softening apparatus, but is adapted for use in various fluid treating systems such as filtering, chemical treating and selective fluid mixing and discharging.

The invention is particularly concerned with the construction and operation of a manually actuated single control valve wherein a uniform improved operation of the fluid treating apparatus is attained at all times. This is an important feature in connection with water softening, in view of the fact that water softening units are required to operate in different localities under varying static water pressures. For instance in one locality the static water pressure might be 25 pounds per square inch while in another place the static pressure may be as high as 100 pounds per square inch. In both cases it is necessary to have the same flow rate for proper backwashing of the mineral bed.

It is a particular object of this invention to provide a valve wherein provision is made for regulating the back-wash pressure so that a proper and highly efficient operation of the water treating system may be obtained in all cases regardless of the main line pressure.

Another object of this invention is to incorporate in a single unitary valve assembly a brine valve and refill valve, which assures that the brine tank will not overfill at any time, and that the brine will be completely shut off when required.

Another object of this invention is the novel arrangement for sealing the drain valve without the use of springs or the like and to make use of hydraulic pressure for forming the seal. This construction eliminates the use of a separate manually operated valve in the drain line.

Another object of this invention is to provide a valve wherein two operations are brought about in one position of the valve, provision being made so that by one setting of the valve the water softening mineral will be slowly rinsed while simultaneously water is supplied to refill the brine tank with fresh water to its original level.

Another object is to provide a valve wherein the shape of the openings therein is designed to allow the maximum rate of flow at low pressure differentials, and which at the same time permits the use of a valve of smaller dimension to produce this flow rate.

Another object of this invention is to provide a metal-to-metal seal in a unitary valve assembly which is adequate under relatively low fluid pressure differentials exerted on the rotor and valve body, while at the same time assuring positive fluid sealing where necessary by the use of composition disc. The disc means is preferably actuated by admitting fluid under pressure from the inlet side in contact with the disc to cause it to close port openings opposed thereto during use of the valve.

Still another object of this invention is to provide a single control valve of the disc type rather than the plug type, which substantially eliminates the sticking of the rotor in the valve body. This is a common fault with the plug type valve whether they be straight plugs or tapered plugs.

In the accompanying drawings forming a part of this specification.

Figure 1:
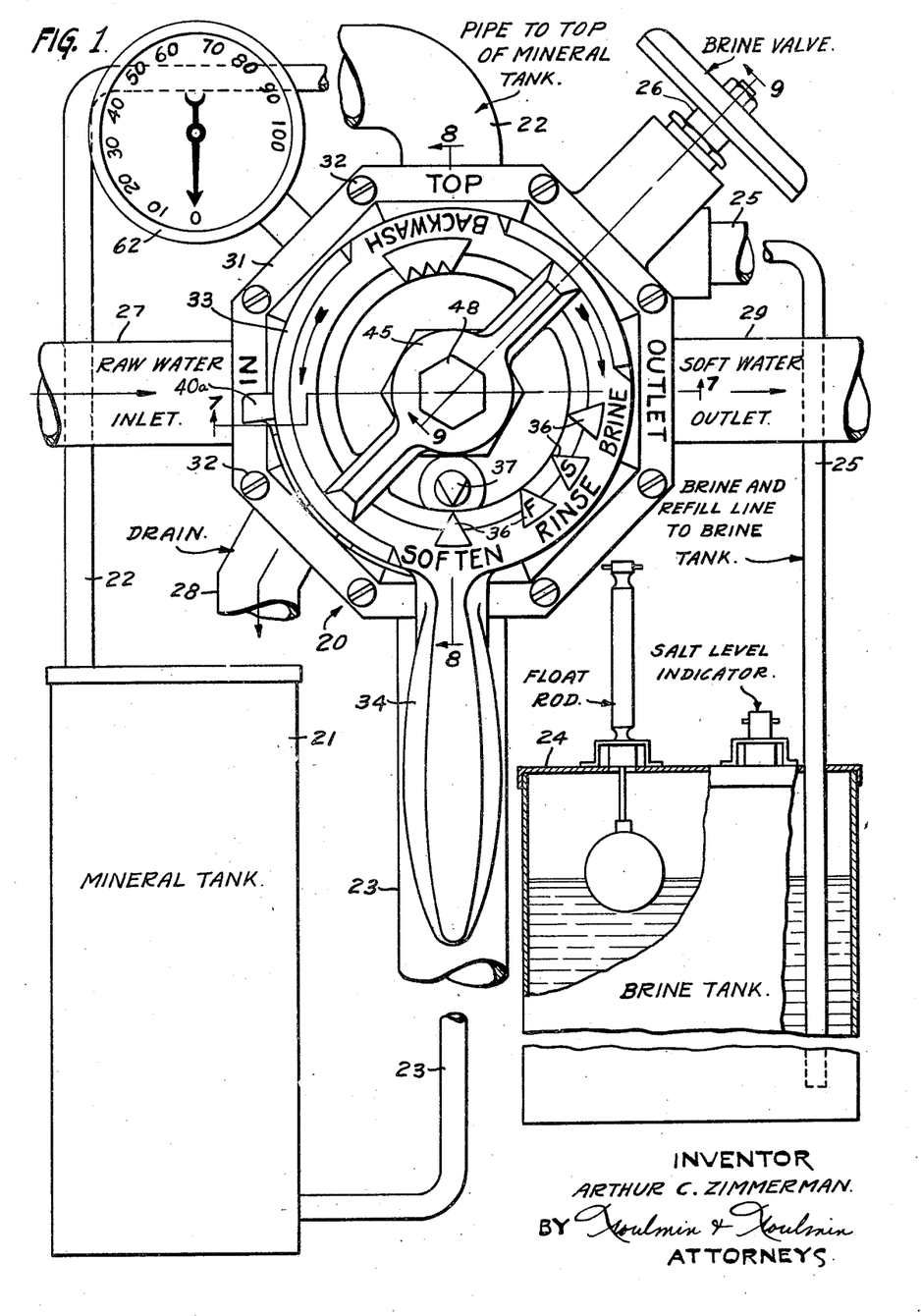
Figure 1 is a top plan view illustrating the unitary valve of this invention as used in connection with a water softening apparatus, the pipe connections and associated tanks being shown diagrammatically.
Figure 2:
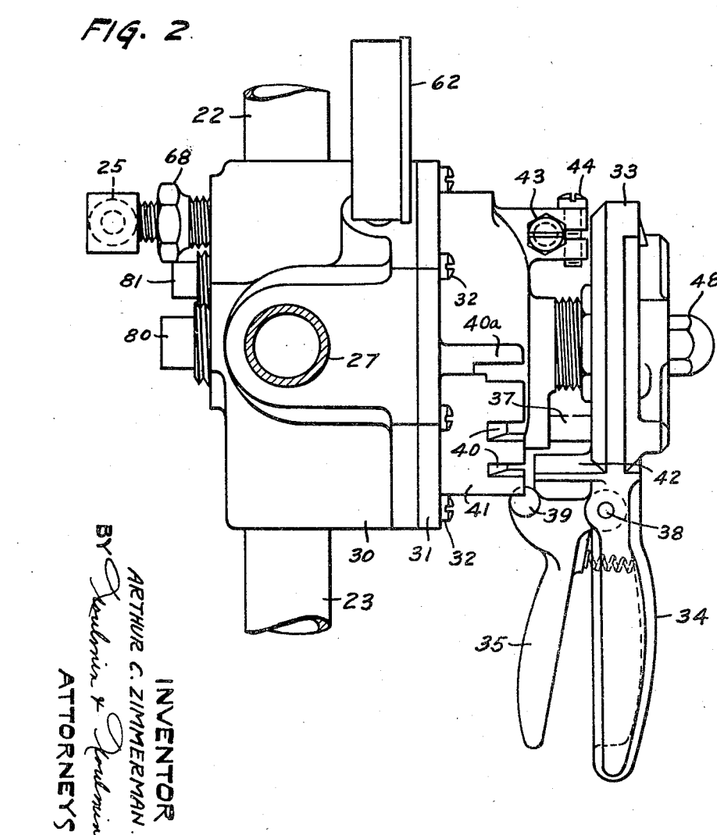
Figure 2 is a side view of the valve as viewed facing the raw water inlet.
Figure 3:
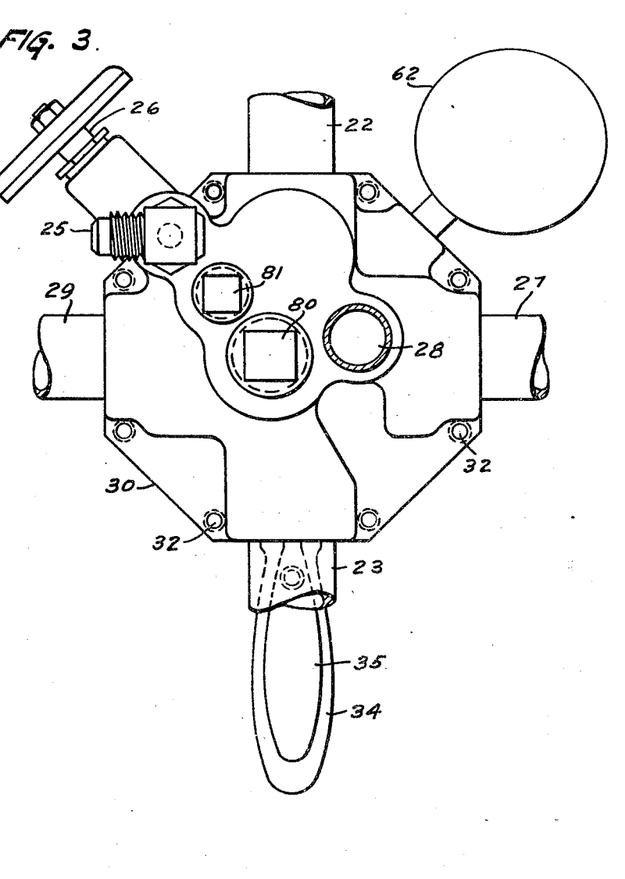
Figure 3 is a rear view thereof.
Figure 4:
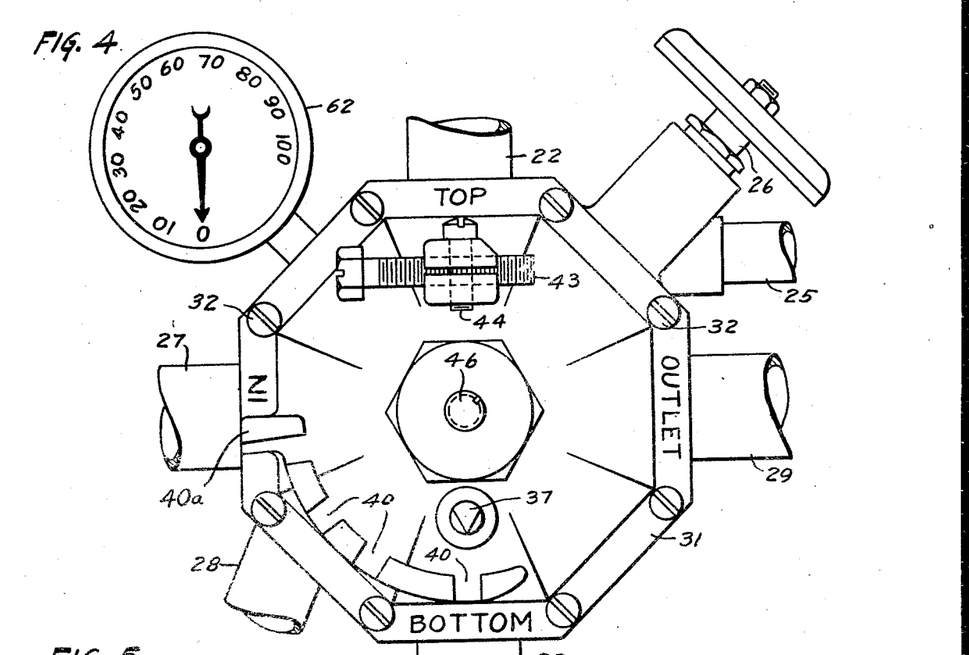
Figure 4 is a front view with the valve handle and dial removed.

Referring to the drawings in detail, wherein for the purpose of illustration there is shown in Figure 1 the preferred embodiment of the valve, the numeral 20 designates the unitary valve of this invention connected in a water softening system. A tank 21 containing water softening mineral is connected to the valve 20 through the pipe 22 which enters the top of the mineral tank. From the bottom of the mineral tank 21 a return pipe 23 communicates with the opposite side of the valve. The unitary valve also communicates with the brine tank 24 by means of the pipe line 25 and the auxiliary valve 26.

Raw or hard water, such as may be supplied through a city water main or other source, is connected to the valve 20 by means of the pipe 27. A waste or drain pipe 28 communicates with one of the unitary valve chambers having a given size orifice through which fluid flows to the drain at certain settings of the valve. Throughout the specification and claims where mention is made of a drain or drain pipe, it is to be understood this refers to a waste discharge opening or waste pipe means. Treated or softened water is delivered to the household system or other place where it is to be consumed, by means of the outlet conduit 29.

UNITARY VALVE CONSTRUCTION

The unitary control valve 20 may be made of any suitable material depending upon the substance with which it will come in contact. For use in water softening apparatus it is preferably made of cast bronze or other appropriate material, and the contacting rotor and valve disc surfaces are made very smooth and straight so as to provide a good fluid seal between the parts and eliminate leakage of the valve. The construction of the control valve is illustrated in Figures 2 to 11, 17 and 18, and comprises an octagonal shaped valve assembly having a body 30 and a cap 31 secured thereon by means of the stud bolts 32.

Mounted on the valve cap 31 is a wheel or disc member 33 having an attached handle 34 and locking member 35 for turning the valve to the desired position. Around the face of the dial 33 are positioned suitable indicia and arrow point markers 36 and 37 to indicate the setting of the valve. The marker 37 is stationary, being mounted on the valve cap 31, and is in alignment with the plane of the markers 36 positioned around the dial 33 and rotated by the handle 34. The latch or locking member 35 is spring actuated and fulcrumed to the handle 34 as at 38, and has a depending ear 39 which is adapted to engage in the notches 40 and against the stop means 40a formed on the upstanding flange portion 41 of the cap 31.

The dial 33 and attached valve mechanism may be turned to the desired position by grasping the handle 34 and unlatching the same by squeezing the latching lever 35 against the handle to disengage the ear 39 from the notched member. When the valve has been set to the desired position it may again be locked by releasing the latching lever 35 and permitting the lug 39 to engage in the notched member.

A depending flange 42 on the dial wheel 33 is arranged to engage an adjustable stop pin 43 on the valve cap 31 for regulating the back-wash valve opening. Any suitable means for locking the screw-threaded stop pin 43 in position may be provided. In the construction shown, the stop pin is threaded into a split upstanding portion formed integral with the cap 31, and a stud bolt 44 joins the two split sections together at the top so that by tightening the bolt 44 the pin 43 will be bound and prevented from moving out of adjustment. The dial wheel 33 is also provided with an integral central hub 45 which is keyed to the shaft 46 so that the valve rotor 47 may be rotated. A nut 48 is threaded onto the outer end of the shaft 46 to secure the member 33 thereto. Suitable stuffing box and packing means is provided to fluid seal the shaft 46 and valve cap 31, as at 49.

Figure 7:
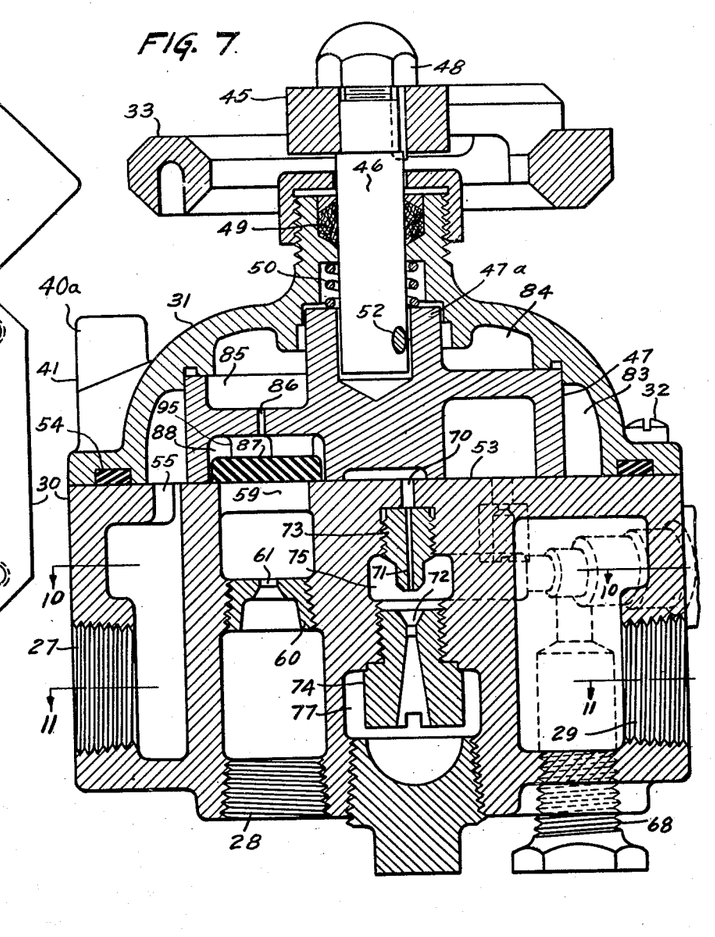
Figure 7 is a vertical sectional view taken along the line 7—7 of Figure 1, looking in the direction of the arrows.
Figures 8, 9:
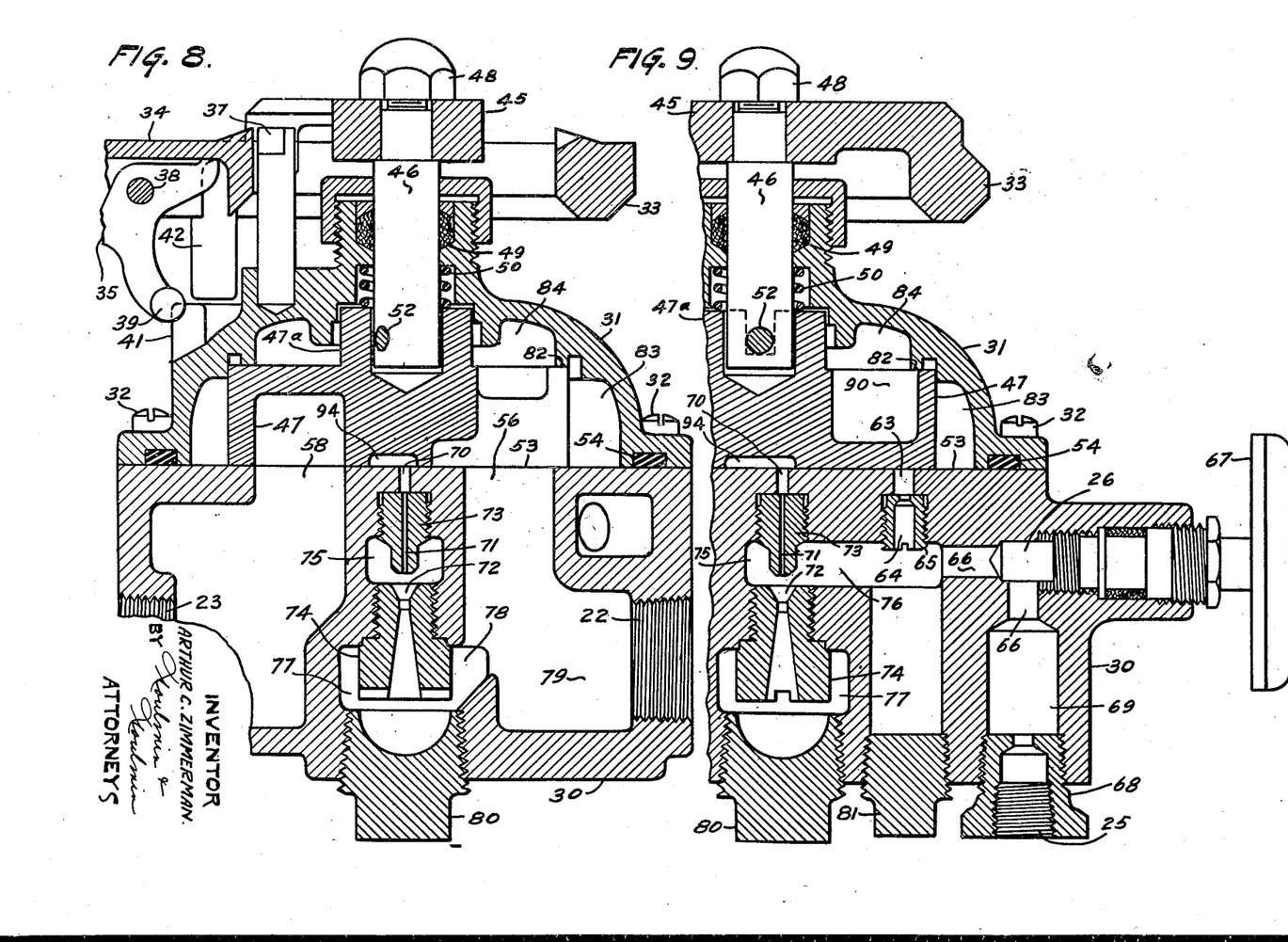
Figure 8 is a similar vertical sectional view taken on the line 8—8 of Figure 1.
Figure 9 is a vertical sectional view taken on the line 9—9 of Figure 1.
Figure 10:
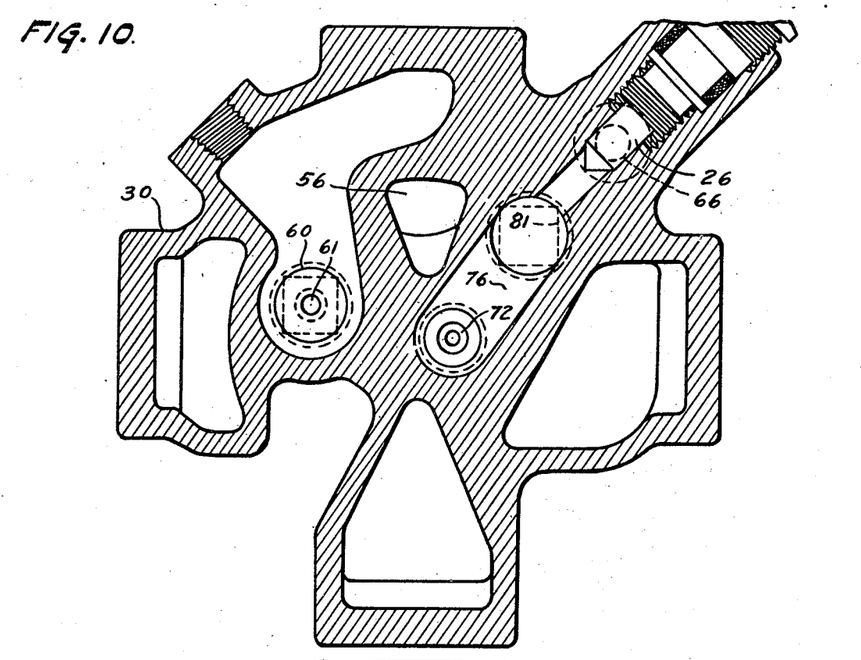
Figure 10 is a horizontal sectional view taken on the line 10—10 of Figure 7.
Figure 11:
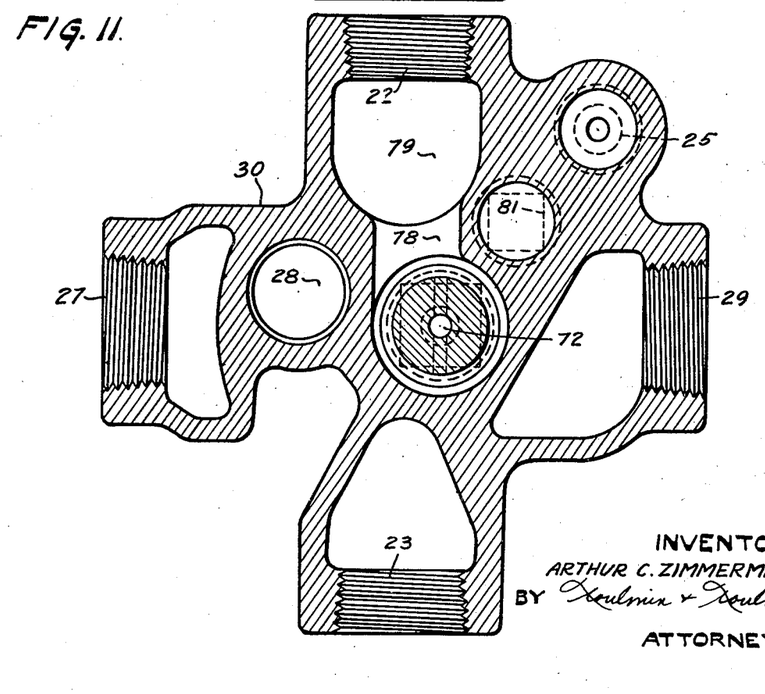
Figure 11 is a horizontal sectional view taken on the line 11—11 of Figure 7.
Figure 18:
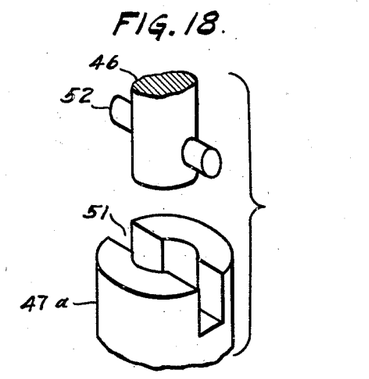
Figure 18 is a perspective view of the universal joint between the rotor and actuating shaft member.

The compression spring 50 is mounted in the valve cap and engages the cylindrical extension 47a of the valve rotor, as shown in Figure 7. The shaft 46 and valve rotor are connected by means of the universal joint formed in the cylindrical extension 47a by the central transfer slot 51 which accommodates the pin 52 fixed to the end of the shaft 46, as illustrated in Figure 18.

The valve body 30 comprises a straight smooth complementary face portion 53 for engaging the cap 31 and between which is disposed a fluid sealing gasket 54 of rubber, leather, or the like. An elongated curved slit 55 in the face of the valve body 30 communicates with the inlet opening 27, and the triangular openings 56, 57, 58 and 59 connect with the mineral tank conduit 22, treated water exit pipe 29, mineral tank conduit 23 and drain 28, respectively. The size of the drain opening is regulated by the member 60 which has a predetermined size orifice 61 to assure a definite flow rate at a given pressure.

A fluid pressure gage 62 mounted on the valve body 30 indicates the pressure of the fluid as it enters the drain orifice 61. The opening 63 communicates through the orifice 64 of the threaded insert member 65 to the passageway 66 which is connected to the brine tank conduit 25 through the auxiliary valve 26. The auxiliary brine valve 26 is actuated by means of the handwheel 67. An aperture nipple 68 may be inserted in the enlarged passageway 69 which communicates with the pipe 25 extending to the brine tank through which brine and water are passed.

The port 70 in the face of the valve body 30 admits fluid to the injector pump apertures 71 and 72 formed in the members 73 and 74, respectively. The throat 75 of the injector is in communication with the brine tank conduit 25 when the valve 26 is opened by way of the chamber 76 and passageway 66. Discharge fluid from the injector pump is conducted through the compartment 77 and into the conduit 22 by way of the opening 78 and chamber 79. Threaded plug members 80 and 81 are arranged adjacent the members 74 and 65 to provide access thereto.

VALVE ROTOR CONSTRUCTION

The construction of the valve rotor 47, as illustrated in Figures 5, 7, 8, 9 and 17, comprises a circular grooved member having a central cylindrical portion 47a in which the end of the shaft 46 and attached pin 52 engage for rotating the rotor. The interior of the valve cap 31 is shaped so as to contact the periphery of the rotor, as at 82. Around the circumference of the rotor a chamber 83 is provided which is in communication with the inlet port 55 and raw water inlet 27. Sufficient fluid space 84 is provided adjacent the cylindrical portion 47a in order to permit the fluid to contact all sides of the valve rotor.

Communication is established to the chamber 84 through the openings in the rotor. Adjacent the central cylindrical hub portion 47a is a shallow groove 85 having a small aperture 86 extending through the rotor which admits water to contact the surface of the triangular shaped insert member 87. This insert member may be made of hard rubber, resin or similar material and is designed to conform to the triangular depressed portion 88 of the rotor.

Figure 5:
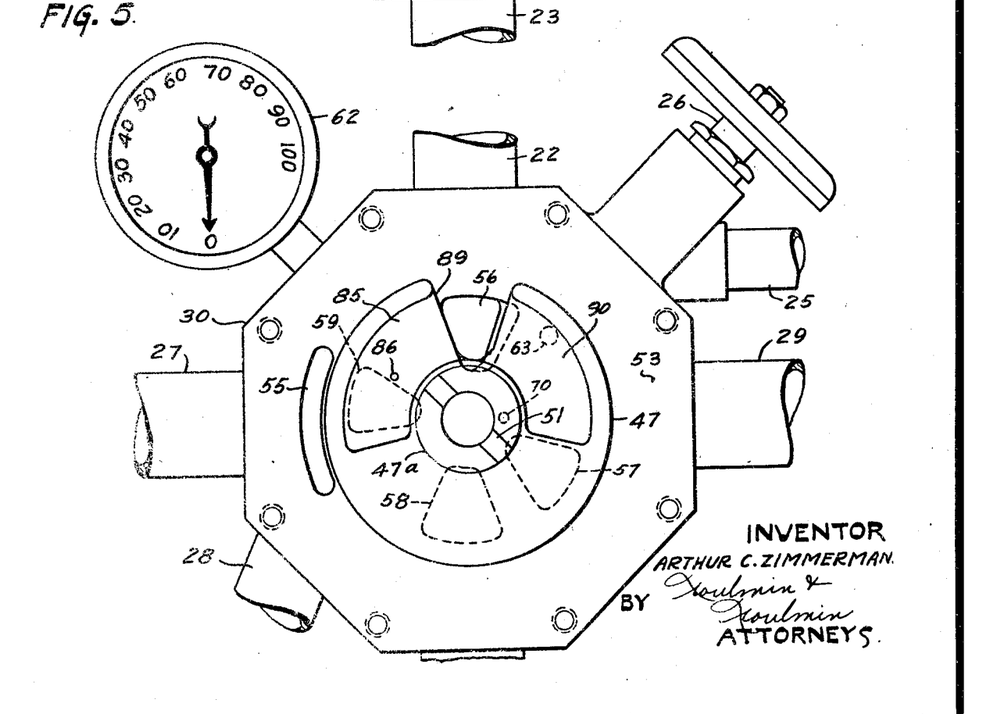
Figure 5 is a similar view with the valve cap removed showing the rotor.
Figure 6:
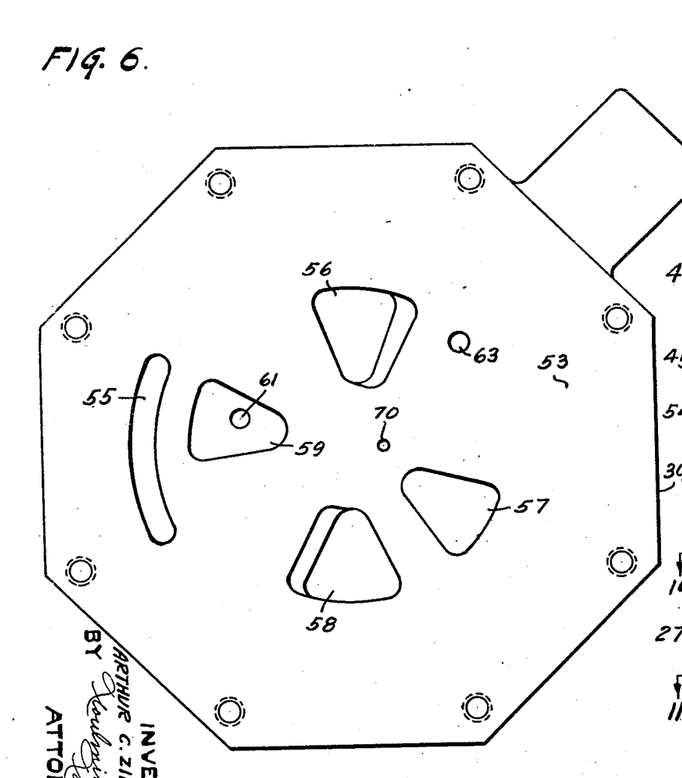
Figure 6 is a plan view of the valve body with the cap and rotor removed.

The groove 85 is open at one end and adjoins a cut-away sector 89. A similarly shaped but deeper grooved portion 90 is formed in the rotor face opposite groove 85 and likewise adjoins the V-shaped cut-away sector, as illustrated in Figure 5. On the reverse side of the rotor a radially disposed hollowed out portion 91 is formed opposite the cut-away sector 89. The apex of the cut-away sector 89 terminates in a narrow groove or channel 92 which is cut under the central body part 93. The shallow central depression 94 is formed in the rotor face during its manufacture. This part is immaterial to the functioning of the rotor and may therefore be omitted entirely. The triangular groove 88 in which is retained the insert disc 87 is provided with integral raised portions 95 so as to maintain the disc 87 spaced from the aperture 86 so as not to hinder the flow of fluid therethrough and to allow the fluid to contact the entire surface of the disc.

METHOD OF OPERATION

Back-washing

By referring to Figures 12 to 16 inclusive, it will be observed that the relative positioning of the rotor grooves with respect to the ports in the adjacent members determines the distribution of the fluid by the valve. Assuming that the unitary valve 20 is connected to a water softening system, as illustrated in Figure 1, and it is desired to regenerate the water softening material contained in tank 21, the valve operating handle 34 will be unlatched and turned counterclockwise to the back-wash position, as indicated on the dial 33. If the pressure shown on the gage 62 is above or below that required to effect the proper back-wash operation, then the handle 34 is returned to its original position and the stop screw member 43, which regulates the back-wash valve opening, is adjusted by loosening the lock screw 44 and advancing or retracting the screw 43 so that the opening permitted by the valve when the depending flange portion 42 engages the end of the adjusting screw 43 will be that necessary to register the proper pressure on the gage 62.

Figure 12:
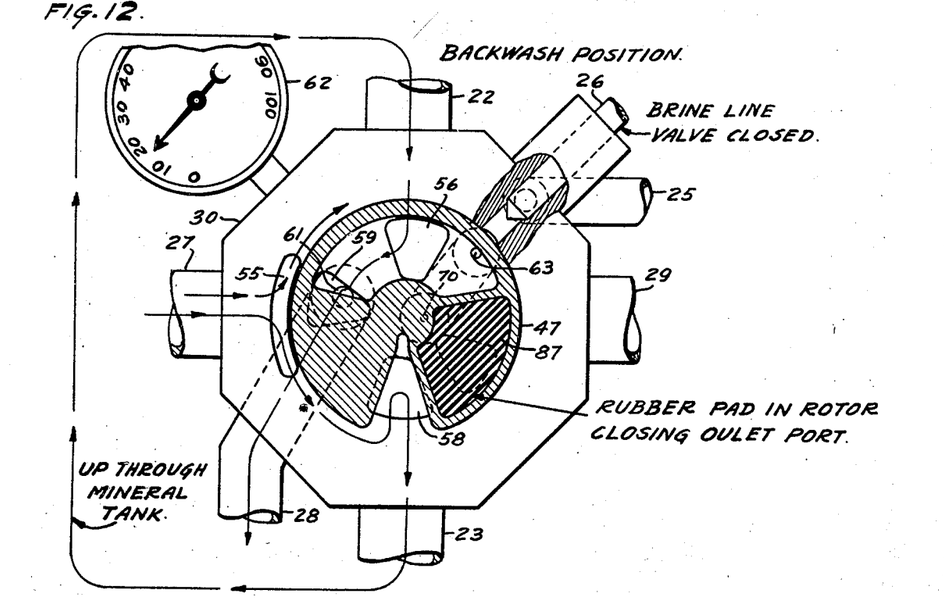
Figures 12 to 16 inclusive illustrate the valve in five different positions for performing the five different operations required in regenerating the water softening mineral.

The back-wash positioning of the valve parts is shown in Figure 12. The rotor is shown in cross section to more clearly show the distribution of the fluid through the valve. When the valve is in the position indicated in Figure 12, water is allowed to flow from the inlet 27 through the opening 55, port 58, down pipe 23, upward through the mineral tank 21, back to the valve by way of the conduit 22 and port 56, and thence into the drain or waste line port 59 and drain exit pipe 28. In this way the softening mineral employed is washed entirely free of foreign matter preparatory to being regenerated.

By adjusting the screw 43 which regulates the back-wash valve opening, a definite flow rate of fluid at a given gage pressure is assured for any given sized orifice 61 in the drain line. This provides a simple and easy method whereby the back-wash flow rate required can be readily obtained by the operator merely by adjusting the stop screw member 43 until the desired pressure is indicated on the gage 62. The port 70 which is the inlet to the injector is closed and the port 86 allows full pressure of the fluid to seal the insert 87 against the valve face of the outlet opening 57.

Brine drawing

Figure 13:
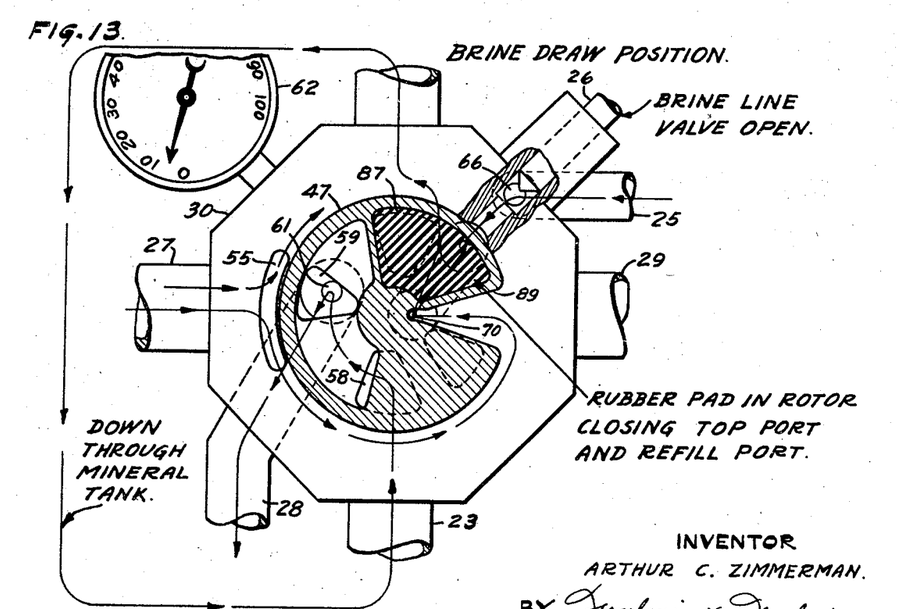

In Figure 13 is illustrated the positioning of the valve rotor during the brine drawing operation. In this position the rotor permits fluid to enter the injector port 70 through the opening slot 89 and undercut passageway 92 to actuate the injector and create a suction on the brine line 66. The brine valve 26 will be opened to allow brine solution to be drawn in through the pipe 25 into the chamber 76, through the injector passageway 72 to the chamber 77, out through the opening 78, chamber 79 and pipe 22 to the top of the mineral tank, through the mineral and out the bottom by way of pipe 23; thence to the opening 56, drain port 59 and drain conduit 58.

Slow brine rinsing and refill

Figure 14:
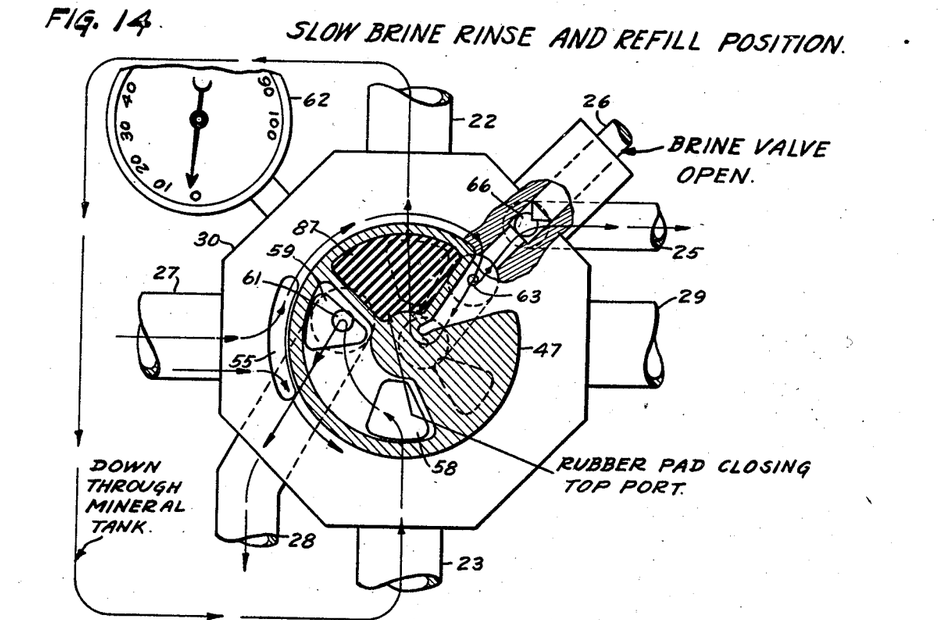

For slow brine rinsing and refilling of the brine tank, the rotor will be positioned as indicated in Figure 14, and the fluid will be distributed in the manner indicated by the arrows. In this position of the valve rotor the brine valve 26 will remain open and the injector port 70 is closed while the port 63 is uncovered to permit water to enter and flow therethrough and outward to the brine tank by means of the pipe 25. At the same time rinse water passes through the injector throat 72 and thence outward through the pipe 22 and downward through the mineral tank, out through the bottom thereof into the return conduit 23, and eventually through the drain port 59 and drain or waste pipe 28.

In this position and construction of the valve, two operations are brought about in one position of the valve. This is a very important feature since by by-passing rinse water through the injector while simultaneously refilling the brine tank with fresh water to its original level, the mineral tank is being washed slowly of its brine which was introduced therein during the regenerating operation. It will be understood that the orifices in the valve body are of such size that by the time the liquid level in the brine tank has arrived at its original level, the mineral in the tank has been contacted by the brine for sufficient time to be entirely regenerated and practically all of the brine washed therefrom.

In this improved unitary valve construction the refill time regulates the time of rinsing the mineral tank and may be considered as a more or less semi-automatic timing device to accomplish this purpose. After the brine tank has been refilled to its original level, which may be indicated by a float rod as shown in Figure 1, or similar means, the brine valve 26 will be closed.

Fast rinsing

The slow rinse operation removes most of the brine, but in order to completely flush out the residue left, the valve is set to allow a larger volume of water to flow through the mineral to quickly remove the remainder of the brine from the mineral tank. By providing for slow rinsing of the mineral while refilling the brine tank the usual time required for rinsing the mineral of brine after regeneration is substantially reduced.

Figure 15:
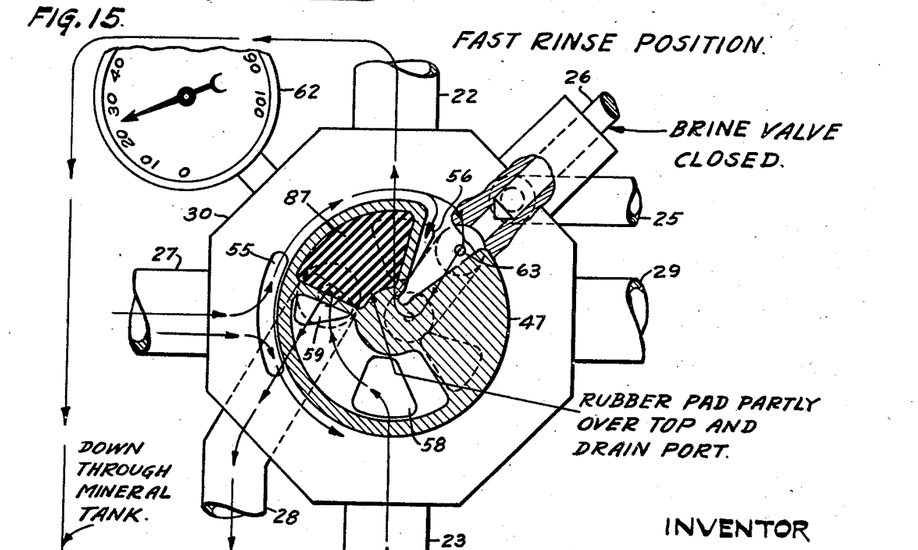

The position of the valve rotor effecting fast rinsing is shown in Figure 15, and the direction of the fluid as distributed by the valve is indicated by the arrows on the drawing. During the fast rinsing operation the rotor is positioned so that water is admitted from the inlet into the ports 56, 63, and outward by way of the pipe 22 to the top of the mineral tank, out the bottom thereof by way of return conduit 23 to the valve, and thence to the waste pipe 28, as in the slow rinsing procedure.

Water softening

Figure 16:
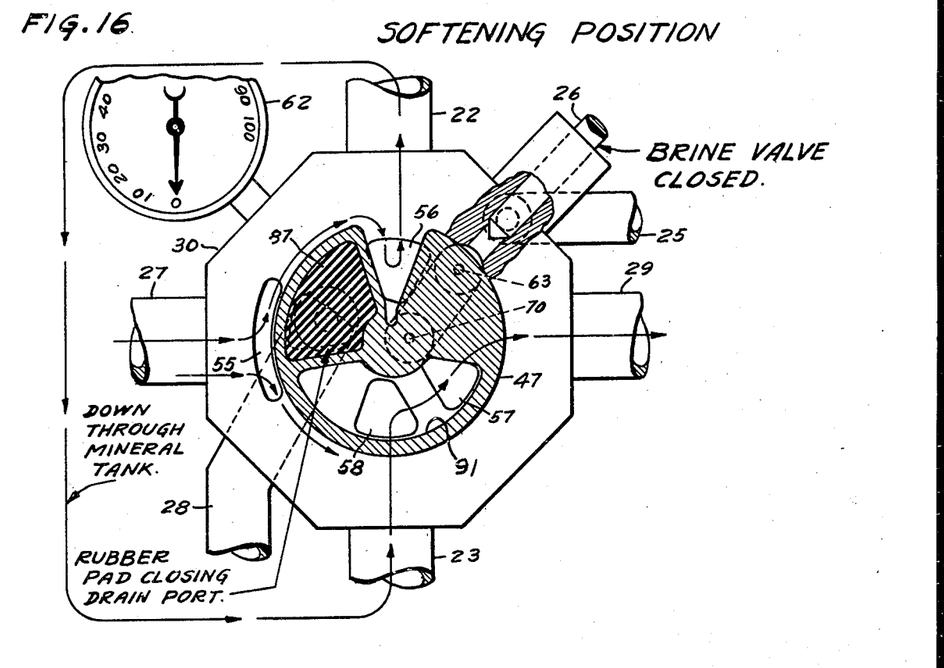
Figure 17:
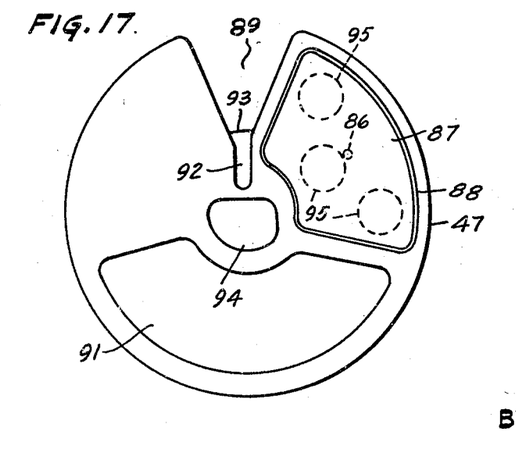
Figure 17 is a bottom plan view of the rotor showing the composition disc in position thereon.

The position of the valve for water softening is illustrated in Figure 16. The rotor in this instance is rotated so that the ports 63 and 70 are maintained closed and a passageway is established between the pipe 23 and the soft water outlet 29 by means of the groove 91 in the rotor. The drain or waste line port opening 59 is maintained closed by the composition insert pad 87. Hard water enters through the inlet pipe 27 and flows around the rotor, out through the open sector 89 of the rotor, into the open port 56, and thence to the conduit 22 and downward through the mineral tank 21. The valve will be retained in this position for supplying soft water until it is found necessary to regenerate the water softening mineral; and then the above described operations will be repeated.

It will be understood, of course, that this invention is not limited to the exact details of construction and operation since obvious modifications within the scope of the description and claims of this invention may be made by persons skilled in the art.

Having thus fully described my invention, what I claim as new and desire to secure by Letters Patent is:

1. In a unitary control valve assembly for a water softening system, in combination, a body member having a plurality of chambers, and a valve seat, ports in said seat connecting with said chambers, a cover forming a pressure chamber with said seat, a rotor in said pressure chamber having a face engaging said seat and having fluid passageways in its face for providing fluid communication between said ports and between said pressure chamber and said ports, one of said body chambers being a fluid inlet chamber connected to said pressure chamber adjacent the periphery of said rotor, one of said ports arranged to admit fluid to a conduit for slow flow, and another of said ports being larger for admitting fluid to said conduit for faster flow, the rotor being rotatable to one position to supply fluid through said first described port and being rotatable to a second position to supply fluid through both of said ports.

2. In a unitary control valve assembly for a water softening system, in combination, a body member having a plurality of chambers, and a valve seat, ports in said seat connecting with said chambers, a cover forming a pressure chamber with said seat, a rotor in said pressure chamber having a face engaging said seat and having fluid passageways in its face for providing communication between said ports and between said pressure chamber and said ports, one of said body chambers being an inlet chamber for a first fluid connected to said pressure chamber adjacent the periphery of said rotor, a valved passage for controlling the flow of a second fluid to one of said chambers, one of said ports being associated with said last mentioned chamber and arranged to admit fluid to a conduit for slow flow, and another of said ports being larger for admitting fluid to said conduit for faster flow, the rotor being rotatable to one position to supply fluid through said first described port and through said valved passage and being rotatable to a second position to supply fluid through both of said ports.

3. In a unitary control valve assembly for a water softening system, in combination, a body member having a plurality of chambers and a valve seat, ports in said seat connecting with said chambers, a cover forming a pressure chamber with said seat, a rotor in said pressure chamber having a face engaging said seat and having fluid passageways in its face for providing fluid communication between said ports and between said pressure chamber and said ports, one of said body chambers being an inlet chamber for a first fluid connected to said pressure chamber adjacent the periphery of said rotor, one of said ports being associated with one of said chambers and restricted to admit said first fluid to said one chamber for slow flow, and another of said ports being larger for admitting said first fluid to said chamber for faster flow, and a valved, restricted passage for controlling the flow of a second fluid to said one chamber proportioned to said restricted port to pass a predetermined volume flow through said restricted passage for a predetermined volume flow through said restricted port, the rotor being rotatable to one position to supply fluid through said first described port and through said restricted passage and being rotatable to a second position to supply fluid through both of said ports.

4. In a unitary control valve assembly for a water softening system, in combination, a body member having a plurality of chambers and a seat, ports in said seat connecting with said chambers, an injector in said body having a passage communicating with said seat, a venturi associated with said injector having the throat thereof in one of said chambers, a flow passage for a first fluid connecting with the chamber with which said injector is associated, one of said ports having a restriction therein and associated with the chamber with which said injector is associated, a rotor engaging said seat, a cover enclosing said rotor and forming a pressure chamber with said seat, one of said body chambers being an inlet chamber for a second fluid connected to said pressure chamber adjacent the periphery of said rotor, a sector shaped depression in said rotor providing a passage for selectively interconnecting said ports in said seat, a second sector shaped depression in said rotor having a resilient valve member therein engaging said seat for selectively closing said ports in said seat, a sector shaped passage in the edge of said rotor interconnecting said ports with said pressure chamber, the rotor being rotatable to one position wherein said sector shaped passage in the edge of said rotor interconnects said restricted passage with said pressure chamber for supplying low volume flow of said second fluid to the chamber associated with said injector and with said first fluid flow passage and being rotatable to a second position wherein said sector shaped passage in the edge of said rotor interconnects said restricted passage and another of said ports in said seat with said pressure chamber to supply said second fluid to said last mentioned chamber at greater volume flow.

5. In a unitary control valve assembly for a water softening system, in combination, a body member having a plurality of chambers and a seat, ports in said seat connecting with said chambers, a cover forming a pressure chamber with said seat, a rotor in said chamber having a face engaging said seat and having fluid passageways in its face for providing fluid communication between said ports and between said pressure chamber and said ports, one of said body chambers being a fluid inlet chamber connected to said pressure chamber adjacent the periphery of said rotor, and a waste fluid passage in one of said chambers having a restriction therein, the rotor being rotatable to a position where a passageway thereof interconnects the pressure chamber with a port in communication with said waste fluid passage chamber, said position of the rotor being adjustable to vary the communication of said passageway with said waste fluid passage chamber port, for predetermining the fluid flow therethrough.

6. In a unitary control valve assembly for a water softening system, in combination, a body member having a plurality of chambers and a seat, ports in said seat connecting with said chambers, a cover forming a pressure chamber with said seat, a rotor in said chamber having a face engaging said seat and having fluid passageways in its face for providing fluid communication between said ports and between said pressure chamber and said ports, one of said body chambers being a fluid inlet chamber connected to said pressure chamber adjacent the periphery of said rotor, and a waste fluid passage in one of said chambers having a restriction therein, the rotor being rotatable to a position where a passageway thereof interconnects the pressure chamber with a port in communication with said waste fluid passage chamber, and adjustable means for limiting the rotation of said rotor to adjustably limit communication between said rotor passageway and said waste fluid passage chamber port.

ARTHUR C. ZIMMERMAN.